Patented Apr. 1, 1941

2,236,521

UNITED STATES PATENT OFFICE 2,236,521

INK

Roy E. Coleman, Meriden, Conn., assignor to The Zein Corporation of America, a corporation of Delaware No Drawing. Application August 12, 1937, Serial No. 158,737

6 Claims. (Cl. 134—35)

This invention relates to inks and more particularly to printing inks and printing ink bases made from a zein vehicle or other prolamin vehicle. The invention set forth herein is related to the invention described in my copending application (Case No. 7) Serial No. 158,215, filed August 9, 1937.

In the following description of my invention I will refer to the preparation of inks and ink bases made from zein, but it is of course to be understood that my invention is also applicable to the preparation of inks and ink bases made from the other prolamins such as, for example, gliadin from wheat, hordein from barley, kafarin from kafir and the prolamins from other cereal grains. The zein used in accordance with my invention may be completely dry or the commercial product which contains a small percentage of moisture.

In accordance with my present invention I have found that ink vehicles made from zein may be used in lieu of the present known ink vehicles to form a printing ink or a printing ink base. The ink vehicles embodying my invention may be substantially non-aqueous and contain 5% or less of added water; or they may be substantially anhydrous and contain no added water; or if desired, they may be aqueous and contain added water in the order of about 5 to 50%. In carrying out my invention, the vehicle may be formed by dissolving zein in a direct solvent or the combination of a direct or initiating solvent for zein and a solvent which may or may not be a solvent for zein as described and claimed in my prior copending applications (Cases 1 to 6) Serial Nos. 158,209, 158,210, 158,211, 158,212, 158,213, and 158,214, filed August 9, 1937. The ink vehicles, formed as described in these prior copending applications, comprise one part by weight of zein or other prolamin and at least about two parts by weight of the solvent or solvent mixture and are characterized by being stable against separation of the prolamin at temperatures of 70° F. In the case where ethyl alcohol alone is used as the solvent as described in application Serial No. 158,209, the proportion of said alcohol to the zein varies from about 2 to about 3 parts by weight of said alcohol to 1 part by weight of zein.

The direct or initiating solvents for zein may suitably be aqueous low-molecular weight alcohols such as aqueous ethanol, aqueous isopropanol and the like; 95% or 98% alcohol; the glycols such as ethylene glycol, diethylene glycol, propylene glycol and the like; the glycol ethers such as ethylene glycol monomethyl ether, ethylene glycol monoethyl ether, diethylene glycol monomethyl ether, diethylene glycol monoethyl ether and the like; the ketone-alcohols such as diacetone alcohol; the closed chain alcohols such as benzyl alcohol, cyclohexanol, furfuryl alcohol and the like, the hydroxy acids and their esters such as lactic acid, ethyl lactate and the like; or any mixture of the above solvents.

The non-solvents, or those in general incapable of effecting solubility of zein, may be one of the common lacquer solvents or lacquer plasticizers and the like such as, for example, dioxan, the ketones such as acetone, methyl ethyl ketone diisobutyl ketone and the like; the esters such as methyl acetate, ethyl acetate, ethyl butyrate, butyl butyrate, glycol diacetate, dimethyl phthalate, diethyl phthalate, dibutyl phthalate, tricresyl phosphate and the like; the butyl alcohol ethers such as ethylene glycol monobutyl ether, diethylene glycol monobutyl ether and the like; the alcohols such as butanol, isobutanol, amyl alcohol, octyl alcohol and the like; the hydrocarbons such as benzene, toluene, xylene, cyclohexane and the like; chlorinated compounds such as ethylene dichloride, monochlorobenzene, orthodichlorobenzene, dichlorethyl ether and the like, furane derivatives such as furfuryl acetate, furfural and the like; and other common lacquer solvents and lacquer plasticizers.

The ink vehicle embodying my invention may be mixed directly with a coloring agent or mixture of coloring agents to form the ink or ink base by any of the known methods such as by grinding in a stone paint mill, roller mill, ball mill and the like. If desired, the coloring agent may be dispersed in a suitable medium which is compatible with the zein vehicle, and the dispersed coloring agent may then be mixed with the zein vehicle to form the ink or ink base. The dispersing medium may suitably be a fatty acid such as linseed fatty acid, soya bean fatty acids, oleic acid and the like. The proportions of coloring agent or agents to the vehicle may vary widely to produce inks of varying consistencies to meet any desired need. Thus, I have produced suitable inks or ink bases wherein the coloring agent or agents vary from about 2% to about 85% by weight and the vehicle from about 15% to about 98%. These inks may vary in consistency from a thick, smooth paste to a thin, free flowing liquid.

The coloring agent or agents utilized in accordance with my invention may suitably be a black color such as, for example, carbon black, lamp black, animal or bone black and the like; a precipitated color such as for example, cadmium yellow, cadmium red, Prussian blue, ultra marine blue and the like; earth colors such as ochres, siennas, iron oxides and the like; white pigments such as white lead, zinc oxide, titanium oxide, lithopone and the like; organic colors such as naphthol yellow S, Persian orange, lithol red, eosine, rhodamine, quinoline yellow, indigo, methyl violet and the like; and combinations of these coloring agents with fillers such as blanc fixe, barytes, asbestine, calcium carbonate, china clay, satin white, silica and the like.

The ink vehicle may comprise a solution of zein in any of the solvents or mixture of solvents enumerated above, but the choice of ingredients constituting the vehicle will, of course, be influenced by the properties desired in the inks and by the compatibility of the ingredients constituting the vehicle with the coloring agent or agents. Thus, by a proper choice of the solvents for zein and of modifying agents as hereinafter set forth, the inks produced may be controlled as to consistency, drying time, flow, penetration, gloss, tendency towards thickening and action on the printing presses and the like. The choice of coloring agent or agents employed in accordance with my invention is likewise influenced by the properties desired in the inks as well as by the character of the vehicle with which it is to be mixed and the compatibility of the coloring agent or agents with the particular vehicle used. The coloring agent and vehicle combinations forming the inks constituting my invention should be of such character that undue thickening or livering does not take place; however, the coloring agent and vehicle combinations may have such activity as to impart to the ink the desired body, consistency and working characteristics. The consistency and hence the working characteristics of the inks embodying my invention are also influenced by the ratio of coloring agent to the vehicle, the oil absorption properties of the coloring agent and the consistency of the vehicle.

The following detailed descriptions are offered as illustrative examples of printing inks or printing ink bases embodying my invention as well as the methods of preparing the same; however, my invention is not to be construed as limited thereto since other suitable inks or ink bases having zein vehicles are intended to be included within the scope of my claims. In the examples, the term "parts" means parts by weight.

Example 1

A zein vehicle is formed by dissolving 40 parts of zein in 80 parts of 95% alcohol at a temperature of about 80 to 85° F. 98 parts of this vehicle is then mixed with 2 parts of carbon black in a laboratory paint mill to form a viscous liquid ink. The ink consists of 98% vehicle and 2% color.

Example 2

20 parts of zein are mixed with 100 parts of 95% of alcohol at a temperature of about 80 to 85° F. to form a solution. 18 parts of diethylene glycol monoethyl ether are then added and the solution is heated to about 110 to 120° F.

50 parts of WW rosin are dissolved in 50 parts of anhydrous denatured alcohol containing about 7 to 10% of ethyl acetate as the denaturant.

75 parts of the zein solution are then mixed with 25 parts of the rosin solution to form the vehicle.

80 parts of this mixed vehicle are then mixed with 20 parts of carbon black in a laboratory paint mill to form an ink having a consistency of a paste. The ink consists of 80% vehicle and 20% color.

Example 3

A vehicle is formed by dissolving 4 parts of zein in 20 parts of cyclohexanol at a temperature in the order of about 190° F., cooling the solution to about 130° F. and adding 20 parts of 95% alcohol, 5 parts of linseed fatty acids and 5 parts of toluol.

28.6 parts of this vehicle are then ground with 71.4 parts of a pigment consisting of equal parts of C. P. chrome yellow and calcium carbonate to form an ink having the consistency of a soft heavy paste. The ink consists of 28.6% vehicle and 71.4% color.

Example 4

20 parts of zein are dissolved in 100 parts of 95% alcohol at a temperature in the order of about 80 to 85° F. 18 parts of diethylene glycol monoethyl ether are then added and the solution heated to about 110 to 120° F. to form the zein vehicle.

A pigment mixture is made up by combining 35 parts of chrome yellow, 50 parts of zinc oxide, 20 parts of barytes and 30 parts of blanc fixe.

Equal parts of the pigment mixture and the zein vehicle are then compounded in a laboratory paint mill to form an ink having a fairly thin consistency. The ink consists of 50% vehicle and 50% color.

Example 5

17 parts of zein are dissolved in 34 parts of 95% alcohol at a temperature in the order of about 80 to 85° F., 25 parts of linseed fatty acids and 25 parts of diethylene glycol monoethyl ether are then added and the solution heated to about 110 to 120° F. to form the zein vehicle.

50 parts of the zein vehicle are then compounded with 50 parts of chrome yellow in a laboratory paint mill to form an ink having the consistency of a fairly heavy paste. The ink consists of 50% vehicle and 50% color.

Example 6

15 parts of zein are dissolved in 60 parts of propylene glycol at a temperature in the order of about 135 to 145° F. to form a zein vehicle. This vehicle is then compounded with 25 parts of chrome yellow in a laboratory paint mill to form an ink having the consistency of a heavy thick liquid. The ink is slow drying and is free from added water. The ink consists of 75% vehicle and 25% color.

Example 7

10 parts of zein are dissolved in 125 parts of a solvent mixture containing 40% of cyclohexanol, 40% of 95% alcohol, 10% of toluol and 10% of linseed fatty acids. In practice, the zein is heated in the cyclohexanol at a temperature of about 190 to 200° F. for about 10 to 15 minutes to effect solution. The solution is then cooled to about 130° F. and the 95% alcohol, toluol and linseed fatty acids are then added to form the zein vehicle.

A pigment mixture is formed by combining 40 parts of white lead and 160 parts of barytes.

36 parts of the zein vehicle are then compounded with 200 parts of the pigment mixture in a laboratory paint mill to form an ink having the consistency of a paste. The ink consists of about 15% vehicle and about 85% color.

Example 8

20 parts of zein are dissolved in 80 parts of a solvent mixture consisting of 80% diacetone alcohol and 20% water heated to a temperature in the order of about 135° F. for about 5 minutes to form the zein vehicle.

52 parts of a pigment mixture containing 36 parts of lithopone and 16 parts of china clay are then compounded with 48 parts of the zein vehicle in a laboratory paint mill to form an ink having the consistency of a fairly heavy liquid. The ink consists of 48% vehicle and 52% color.

Example 9

20 parts of zein are mixed with 100 parts of 95% alcohol at a temperature of about 80 to 85° F. to form a solution. 18 parts of diethylene glycol monoethyl ether are then added and the solution is heated to about 110 to 120° F.

2 parts of R. S. ½ sec. cellulose nitrate are dissolved in 4 parts of diethylene glycol monoethyl ether.

75 parts of the zein solution are then mixed with 25 parts of the cellulose nitrate solution to form the zein vehicle.

The zein vehicle is then mixed with 25 parts of C. P. chrome green to form a liquid ink. The ink consists of 80% vehicle and 20% color.

The inks or ink bases produced in accordance with my invention are suitable, or may be made suitable in a known manner, for use in rotogravure, lithographic, offset and half-tone printing, or for job, automatic, web, cylinder and rotary press printing, or for engraving and stamping, mimeographing and stenciling purposes and the like. These inks are adapted for printing on paper, glassine paper, Cellophane, cloth, glass, metal, wood or any other desired surface. They possess the necessary cohesion to work easily and well on printing presses and, in view of the adhesive characteristics of the zein, to adhere properly to the paper or other printing surface. The inks embodying my invention have the unusual property of being able to "give up" their solvent or solvents readily when applied to any surface and are in general characterized by rapid drying, and form a tough, flexible, non-tacky, hard, non-smudging, and non-scratching adherent coating of ink. These inks may be made of a consistency and character so as to be capable of being used directly for printing, or they may be made in the form of a base which can be thinned or modified as desired to produce inks having any desired consistency and such desired properties to meet a particular need.

The inks and inkbases produced in accordance with my invention may be thinned by the addition of any of the direct solvents for zein or suitable compatible non-solvents and diluents set forth above. The inks and ink bases may be modified by the addition of solutions of resins which are compatible with the zein vehicle, compatible plasticizers, solutions of metallic soaps which are compatible with the zein vehicle, cellulose derivatives such as cellulose nitrate, cellulose acetate, ethyl cellulose and the like, as well as by other modifying agents which are compatible or may be made compatible with the zein vehicle, such as the drying, semi-drying and non-drying oils. Of the resins, mention may be made of de-waxed dammar, refined shellac, rosin, Manila gum, ester gum, glycerin and phthalic-anhydride reaction products, phenol-aldehyde resins, urea-aldehyde resins, methyl abietate and the like. Of the metallic soaps mention may be made of zinc resinate, aluminum stearate, aluminum resinate, calcium resinate and the like.

The ink and inkbases may also be modified by the addition of waxes such as, for example, beeswax, carnauba, candelilla and the like; or by the addition of anti-gelling agents such as lactic acid, rosin acids and the like; or by the addition of suitable wetting agents or dispersing agents such as, for example sodium naphthalene sulphonate, sulphonated castor oil, the sulphonated higher fatty alcohols having 8 or more carbon atoms in the chain and the like.

In the claims when I use the expression "substantially non-aqueous" I refer to ink vehicles made from zein or the other prolamins wherein the added water is 5% or less; when I use the expression "substantially anhydrous" I refer to ink vehicles made from zein or the other prolamins wherein the solvent or solvents for the zein are substantially entirely free from added water and hence the ink vehicles are substantially anhydrous; and when I use the expression "aqueous" I refer to ink vehicles made from zein or the other prolamins wherein the solvent or solvents for zein contain over 5% of added water.

I claim:

1. A printing ink comprising zein, a solvent for the zein, linseed fatty acids and a coloring agent.

2. A printing ink comprising zein, cyclohexanol, 95% alcohol, linseed fatty acids, a thinner and a coloring agent.

3. A printing ink comprising zein, 95% alcohol, diethylene glycol monoethyl ether, linseed fatty acids and a coloring agent.

4. A printing ink comprising zein, cyclohexanol, 95% alcohol, toluol, linseed fatty acids and a coloring agent.

5. A substantially non-aqueous printing ink comprising a zein vehicle, a coloring agent suspended therein and a fatty acid derived from glyceride-type of oils, said vehicle comprising 1 part by weight of zein and at least about 2 parts by weight of a substantially neutral, hydroxy organic solvent therefor other than ethyl alcohol alone, said vehicle containing no more than about 5% of added water and being characterized by being stable against separation of the zein at temperatures of 70° F.

6. A substantially non-aqueous printing ink comprising a zein vehicle, a coloring agent suspended therein and a cellulose derivative, said vehicle comprising 1 part by weight of zein at at least about 2 parts by weight of a substantially neutral, hydroxy organic solvent therefor other than ethyl alcohol alone, said vehicle containing no more than about 5% of added water and being characterized by being stable against separation of the zein at temperatures of 70° F.

ROY E. COLEMAN.